United States Patent
Amagai et al.

(10) Patent No.: US 8,792,723 B2
(45) Date of Patent: Jul. 29, 2014

(54) IMAGE PROCESSING APPARATUS AND COMPUTER READABLE MEDIUM

(75) Inventors: Sei Amagai, Kanagawa (JP); Kensuke Ito, Kanagawa (JP); Junichi Matsunoshita, Kanagawa (JP); Tetsuya Kimura, Kanagawa (JP); Masashi Okano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 407 days.

(21) Appl. No.: 13/017,082

(22) Filed: Jan. 31, 2011

(65) Prior Publication Data
US 2012/0057789 A1 Mar. 8, 2012

(30) Foreign Application Priority Data
Sep. 3, 2010 (JP) ................................. 2010-197899

(51) Int. Cl.
*G06K 9/00* (2006.01)

(52) U.S. Cl.
USPC ........... 382/181; 382/112; 382/141; 382/173; 382/275

(58) Field of Classification Search
USPC .................. 382/112, 141–145, 173, 181, 275
See application file for complete search history.

(56) References Cited

U.S. PATENT DOCUMENTS

| | | | |
|---|---|---|---|
| 8,040,571 B2 | 10/2011 | Yamamizu | |
| 8,229,223 B2 * | 7/2012 | Kamio | 382/181 |
| 8,254,663 B2 * | 8/2012 | Kataoka et al. | 382/144 |
| 2009/0073517 A1 | 3/2009 | Kuroda | |
| 2009/0074301 A1 | 3/2009 | Yamamizu | |
| 2010/0142856 A1 * | 6/2010 | Takeuchi et al. | 382/314 |

FOREIGN PATENT DOCUMENTS

| | | |
|---|---|---|
| JP | 2001-238053 A | 8/2001 |
| JP | 4103826 B2 | 6/2008 |
| JP | 2008141683 A | 6/2008 |
| JP | 2009-077049 A | 4/2009 |
| JP | 2009075751 A | 4/2009 |

OTHER PUBLICATIONS

Japanese Office Action dated Mar. 13, 2014 issued in Japanese Patent Application No. 2010-197899.

* cited by examiner

*Primary Examiner* — Wesley Tucker
(74) *Attorney, Agent, or Firm* — Sughrue Mion, PLLC

(57) ABSTRACT

An image processing apparatus includes: a noise position information obtaining unit that obtains noise position information regarding positions of noise in an image read by a reading unit that optically reads a surface of a medium, an image generating unit that generates a noise eliminated image that is obtained by eliminating a noise from the image, a pattern information obtaining unit that obtains pattern information indicating a pattern appearing on the surface of the medium from the noise eliminated image, and a pattern information registering unit that registers the pattern information obtained from areas set on the basis of the noise position information in the noise eliminated image.

5 Claims, 6 Drawing Sheets

IMAGE PROCESSING APPARATUS AND COMPUTER READABLE MEDIUM

CROSS-REFERENCE TO RELATED APPLICATION

This application is based on and claims priority under 35 USC 119 from Japanese Patent Application No. 2010-197899 filed on Sep. 3, 2010.

BACKGROUND

Technical Field

The present invention relates to an image processing apparatus and computer readable medium.

SUMMARY

According to an aspect of the invention, an image processing apparatus includes: a noise position information obtaining unit that obtains noise position information regarding positions of noise in an image read by a reading unit that optically reads a surface of a medium, an image generating unit that generates a noise eliminated image that is obtained by eliminating a noise from the image, a pattern information obtaining unit that obtains pattern information indicating a pattern appearing on the surface of the medium from the noise eliminated image, and a pattern information registering unit that registers the pattern information obtained from areas set on the basis of the noise position information in the noise eliminated image.

BRIEF DESCRIPTION OF THE DRAWINGS

Embodiments of the invention will be described in detail based on the following figures, wherein.

DETAILED DESCRIPTION

Modes for Carrying Out the Invention

Figure 1:
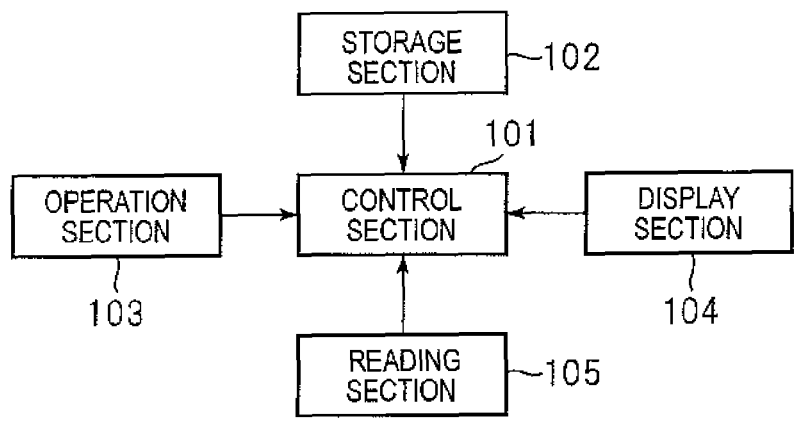
FIG. 1 is a view illustrating a general outline of a configuration of an image processing apparatus according to a first embodiment of the present invention.

Embodiments according to the present invention will be described below referring to the accompanying drawings. The same or equivalent components throughout the drawings are designated by the same reference numerals, and overlapping descriptions are omitted.

First Embodiment

FIG. 1 is a view illustrating a general outline of a configuration of an image processing apparatus 100 according to a first embodiment of the present invention. The image processing apparatus 100 is a multifunctional machine having a copying function and a scanning function, for example. As shown in FIG. 1, the image processing apparatus 100 includes a control section 101, a storage section 102, an operation section 103, a display section 104 and a reading section 105.

The control section 101 is formed of an MPU, for example, and operates according to programs stored in the storage section 102.

The storage section 102 is formed of an information recording medium, such as a ROM, a RAM or a hard disk, for storing programs executed by the control section 101. Furthermore, the storage section 102 also serves as the working memory of the control section 101. The programs may be provided, for example, by downloading via a network, or by various computer-readable recording media, such as a CD-ROM or a DVD-ROM.

The operation section 103 is formed of an interface, such as a plurality of buttons or a touch panel displayed on the display section 104 described later. According to an instruction operation performed by the user, the operation section 103 outputs the content of the instruction operation to the control section 101.

The display section 104 is formed of, for example, a liquid crystal display or an organic EL display, and displays information according to instructions from the control section 101.

The reading section 105 scans the surface of a medium moved by a conveying section 201 described later using image sensors, thereby reading the image of the medium. Specifically speaking, the reading section 105 reads a pattern appearing on the surface of the medium, such as a pattern formed by fibers constituting the medium. The reading section 105 may also be configured so as to read a pattern formed by, for example, minute cracks or the particles of materials on the surface of the medium, as disclosed in Japanese Patent Application Laid-open Publication No. 2005-10581. Furthermore, this embodiment is described assuming that paper, such as manuscript paper, is used as a medium and that a paper fingerprint serving as a pattern appearing on the surface of the medium is read. However, the medium is not limited to such paper, but a plastic substrate, for example, may also be used as a medium.

Figure 2:
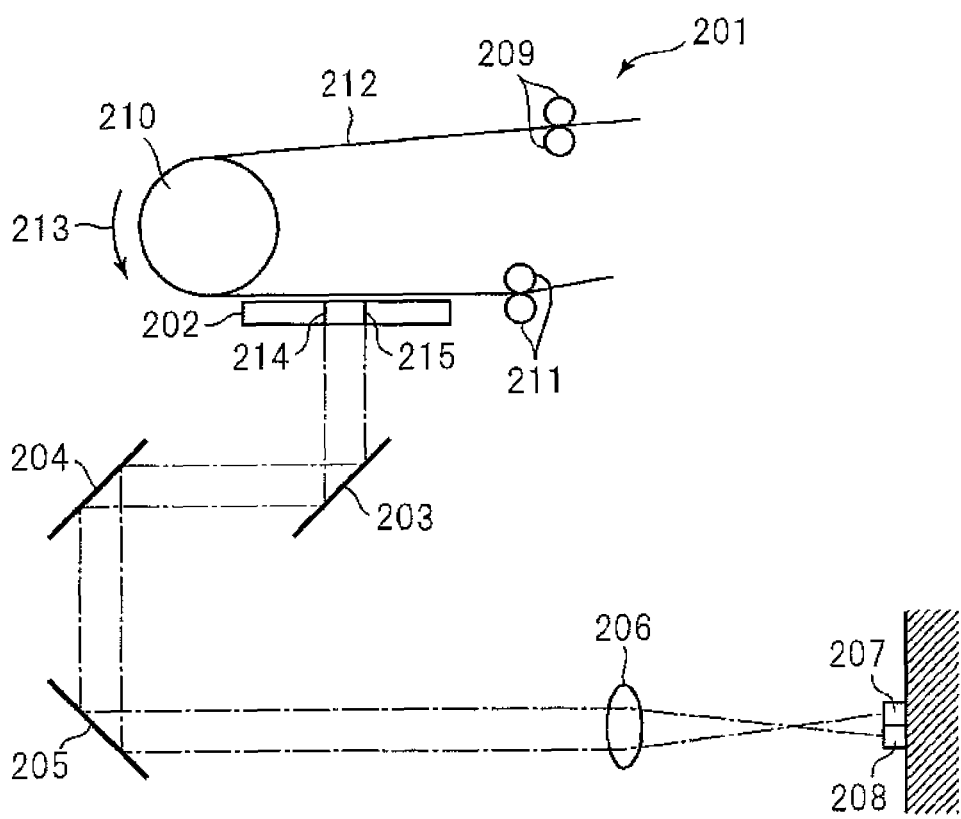
FIG. 2 is a view illustrating a configuration of the reading section of the image processing apparatus.

Specifically speaking, the reading section 105 includes the conveying section 201, a contact glass 202, first to third mirrors 203 to 205, a lens 206, and image sensors 207 and 208 as shown in FIG. 2.

The conveying section 201 has lead-in rollers 209, a conveying roller 210 and discharge rollers 211. The lead-in rollers 209 move a medium 212 (for example, manuscript paper) one sheet at a time to the conveying roller 210 according to an instruction input to the operation section 103 by the user, for example. The conveying roller 210 moves the medium 212 onto the contact glass 202.

At this time, the surface of the medium 212 is read by the image sensors 207 and 208. Specifically speaking, the reflected light from the medium 212 is imaged on the image sensors 207 and 208 via the first to third mirrors 203 to 205 and the lens 206, whereby the image sensors 207 and 208 obtain the image of the surface of the medium 212. It is not needless to say that the reflected light is the reflected light of the light irradiated from a light source (not shown) to the medium 212 and reflected by the surface of the medium 212. In addition, the image sensors 207 and 208 are each formed of, for example, a CCD (charge-coupled device) linear sensor in which light-sensitive cells (pixels), such as photodiodes, are arranged linearly.

More specifically, in this embodiment, the first image sensor 208 reads the surface of the medium 212 at a first reading line 214, and the second image sensor 207 reads the surface of the medium 212 at a second reading line 215. The first reading line 214 is set on the upstream side in the conveying direction and the second reading line 215 is set on the downstream side in the conveying direction as shown in FIG. 2. In addition, the first and second reading lines 214 and 215 are disposed linearly, for example, in a direction (scanning direction) orthogonal to the conveying direction 213 of the medium 212 on the contact glass 202.

The configuration of the reading section 105 shown in FIG. 2 is just an example and not limited to this configuration. Furthermore, the image processing apparatus 100 may be configured to additionally have a network interface (not shown) so as to be communicatable with other computers, facsimile machines, image processing apparatuses, etc. through networks.

Figure 3:
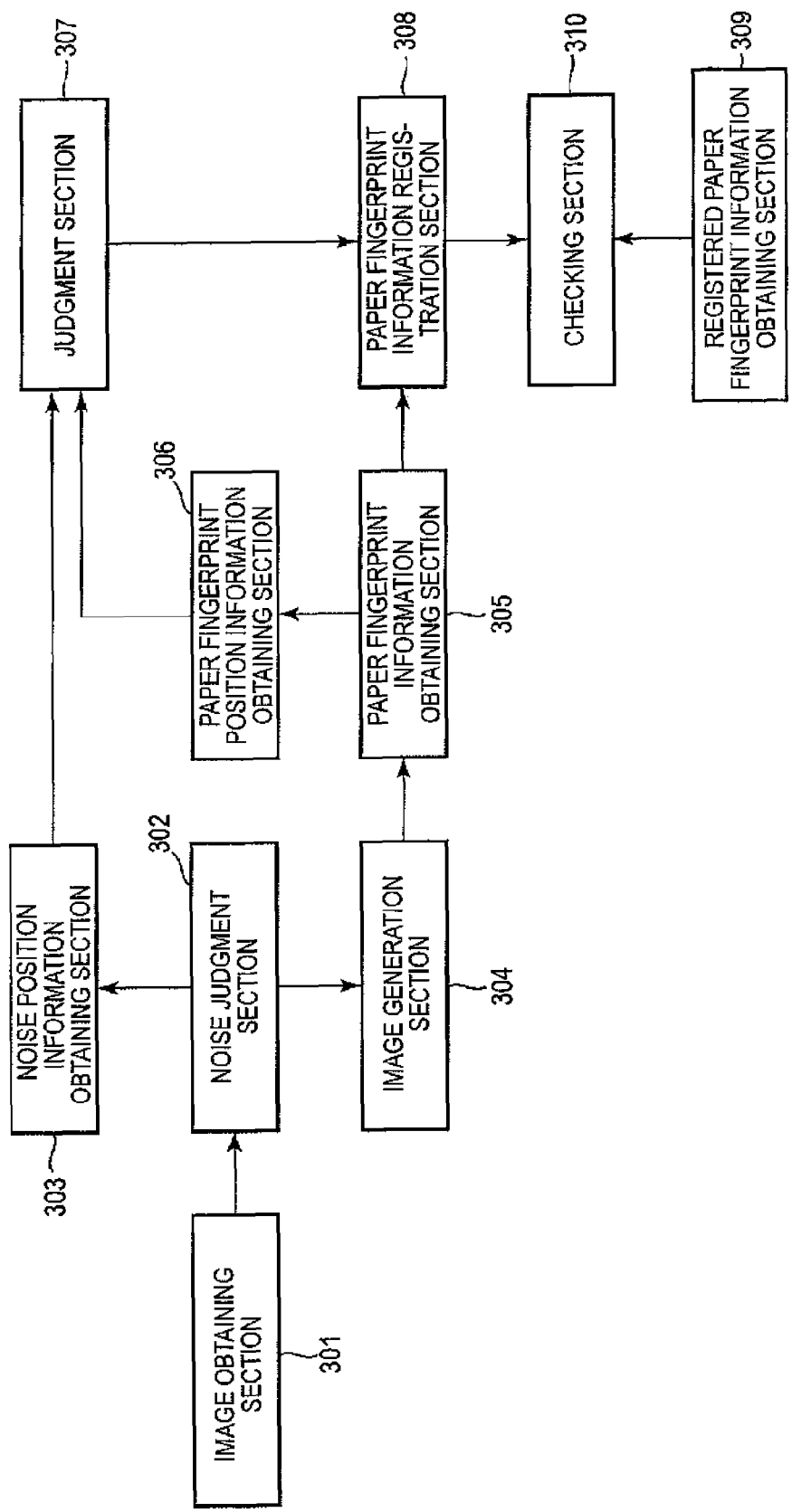
FIG. 3 is a view functionally illustrating a configuration of the control section of the image processing apparatus.

FIG. 3 is a view functionally illustrating a configuration of the control section of the image processing apparatus. As shown in FIG. 3, the control section 101 of the image processing apparatus 100 has an image obtaining section 301, a noise judgment section 302, a noise position information obtaining section 303, an image generation section 304, a paper fingerprint information obtaining section 305, a paper fingerprint position information obtaining section 306, a judgment section 307, a paper fingerprint information registration section 308, a registered paper fingerprint information obtaining section 309, and a checking section 310.

The image obtaining section 301 obtains an image read by the reading section 105. Specifically speaking, the image obtaining section 301 obtains the images of the surface of the medium 212 read using the first image sensor 208 and the second image sensor 207, for example.

On the basis of the images, the noise judgment section 302 judges whether noise is present. Specifically speaking, the following is described by taking a case in which paper powder has attached to part of the second reading line 215, for example. At this time, streaky noise, not present on the medium 212, appears in the sub-scanning direction on the image output from the second image sensor 207. On the other hand, since no paper powder is present on the first reading line 214, the first image sensor 208 reads the surface of the medium 212 normally, and the above-mentioned streaky noise does not appear. The noise judgment section 302 judges whether the image read by the first image sensor 208 is coincident with the image read by the second image sensor 207, thereby judging whether noise due to paper powder, etc. is present.

Figure 4:
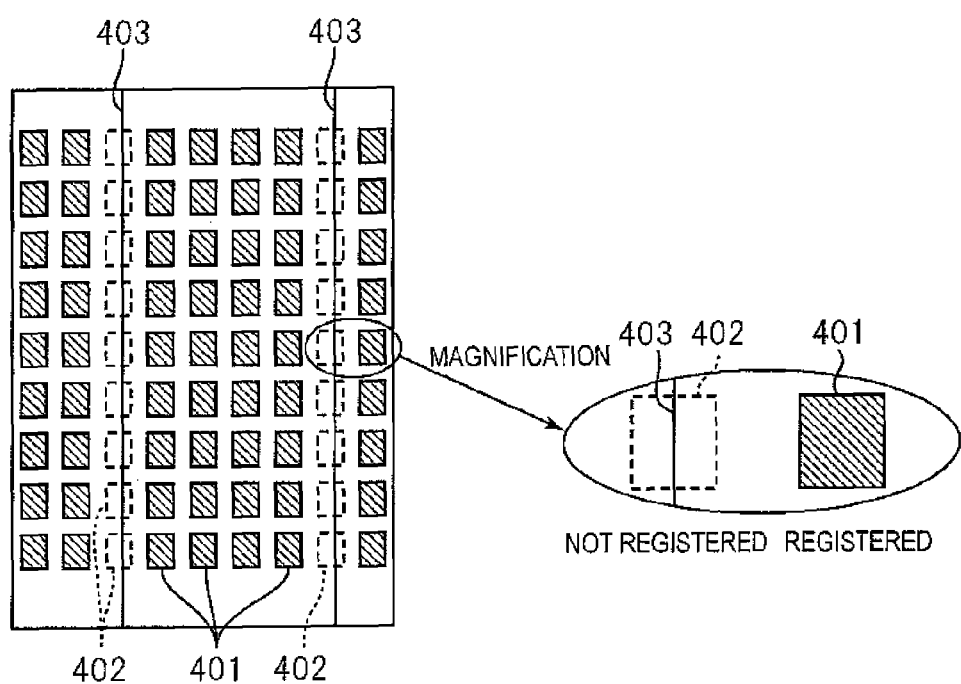
FIG. 4 is a view showing an example of a general outline of the processing executed by the paper fingerprint information registration section of the control section.

The noise position information obtaining section 303 obtains the position information of the noise. Specifically speaking, for example, streaky noise 403 appears in the obtained image as shown in FIG. 4. FIG. 4 is a view showing an example of a general outline of the processing executed by the paper fingerprint information registration section 308. The left side of FIG. 4 shows a case in which the noise 403 is included in the image of a read manuscript, and the right side of FIG. 4 shows an area 401 that is registered by the paper fingerprint information registration section 308 described later and an area 402 that is not registered. In addition, the right side of FIG. 4 is a partly magnified view of the left side of FIG. 4.

The image generation section 304 generates an image from which the noise is eliminated. This is described specifically, for example, by taking the above-mentioned example. Since the noise 403 is present in the image output from the second image sensor 207, the pixel values of pixels having the noise 403 are replaced with the pixel values of pixels having no noise and corresponding to the pixels output from the first image sensor 208.

Furthermore, the image generation section 304 may have other configurations, such as a configuration in which noise is eliminated by smoothing the obtained image or a configuration in which pixels having noise are replaced with the pixels adjacent thereto, provided that noise can be eliminated.

The paper fingerprint information obtaining section 305 obtains paper fingerprint information from the image output from the image generation section 304. Specifically speaking, for example, the paper fingerprint information is obtained from predetermined areas on one or more sheets of the medium 212. The paper fingerprint information is, for example, an image of a pattern formed by fibers constituting the medium 212 (paper). Furthermore, the predetermined area may be the entire area of the medium 212 as shown in FIG. 4 or may be one or more areas including the end sections of the medium 212. Moreover, the area may be set on the basis of the noise position information in a noise eliminated image. Moreover, this will be described below more specifically by taking the example shown in FIG. 4.

The paper fingerprint position information obtaining section 306 obtains the position information of the obtained paper fingerprint information. Specifically speaking, as shown in FIG. 4, a plurality of areas 401 and a plurality of areas 402 are set in the image, and the paper fingerprint information obtaining section 305 obtains the paper fingerprint information of the plurality of areas 401 and the plurality of areas 402. The areas 401 and 402 each correspond to a minimum area for obtaining the paper fingerprint information, for example. In addition, the position information of the paper fingerprint information corresponds to the position information regarding the plurality of areas 401 and the plurality of areas 402. In other words, the areas 401 and 402 from which the paper fingerprint information is obtained have predetermined widths in the main scanning direction and the sub-scanning direction of the medium 212, for example, as shown in FIG. 4. In other words, for example, in the case that a point in a manuscript is used as the origin and that the conveying direction is defined as a y-axis and the direction orthogonal to the conveying direction is defined as an x-axis, a preset range represented by x and y coordinates is used as the position information of the paper fingerprint information.

In the above-mentioned configuration, the areas 401 and 402 are respectively set at predetermined intervals in the main scanning direction (the direction orthogonal to the conveying direction) and the sub-scanning direction (the conveying direction) of the medium 212. However, it may also be possible to use a configuration in which the areas 401 are provided continuously in the main scanning direction and the sub-scanning direction of the medium 212.

The judgment section 307 judges whether the position information of the obtained paper fingerprint information is different from the position information obtained by the noise position information obtaining section 303. Specifically speaking, for example, in the case that the noise 403 is not included in the area 401 (registered area) as shown in FIG. 4, the judgment section 307 judges that the position information of the paper fingerprint information is different from the noise position information.

In the case that the judgment section 307 judges that the position information of the paper fingerprint information is different from the noise position information, the paper fingerprint information registration section 308 registers the paper fingerprint information together with the position information of the paper fingerprint information. Specifically speaking, for example, the paper fingerprint information registration section 308 instructs the storage section 102 to store the paper fingerprint information together with the position information of the paper fingerprint information. It may also be possible to use a configuration in which the paper fingerprint information and its position information are stored in the external database or the like (not shown) of the image processing apparatus 100 through a network. On the other hand, in the case that the judgment section 307 judges that the position information of the paper fingerprint information is not different from the noise position information, for example, in the case that the area 402 (unregistered area) overlaps with the noise 403 as shown in FIG. 4, the paper fingerprint information and its position information are not registered (stored).

The processing of the judgment section 307 and the processing of the paper fingerprint information registration section 308 are repeated until all the areas 401 included in the image are judged.

The registered paper fingerprint information obtaining section 309 obtains the paper fingerprint information and its position information stored in the storage section 102 or other storage media, such as the external database of the image processing apparatus 100. At this time, for example, the user inputs a file name, etc. through the operation section 103, whereby the registered paper fingerprint information obtaining section 309 obtains the paper fingerprint information and its position information corresponding to the file name.

The checking section 310 obtains the paper fingerprint information (checking paper fingerprint information) regarding the medium 212 to be checked and its position information from the paper fingerprint information registration section 308 and also obtains the registered paper fingerprint information (registered paper fingerprint information) corresponding to the medium 212 to be checked and its position information from the registered paper fingerprint information obtaining section 309. Then, the checking section checks the checking paper fingerprint information against the registered paper fingerprint information with respect to the corresponding position information.

Specifically speaking, the originality of the medium 212 is verified depending on whether the correlation value of the registered paper fingerprint information and the checking paper fingerprint information is a preset reference value or larger, as described in Japanese Patent No. 4103826, for example. However, since the details of the processing are known, the detailed descriptions thereof are omitted.

The checking section 310, for example, displays the result of the checking on the display section 104. For example, in the case that the medium 212 to be checked is determined to be original as the result of the matching, "ORIGINAL" is displayed, and in the case that the medium 212 to be checked is determined to be unoriginal, "UNORIGINAL" is displayed. The messages displayed are not limited to these, but predetermined symbols, such as ○ and x, may also be displayed.

Figure 5:
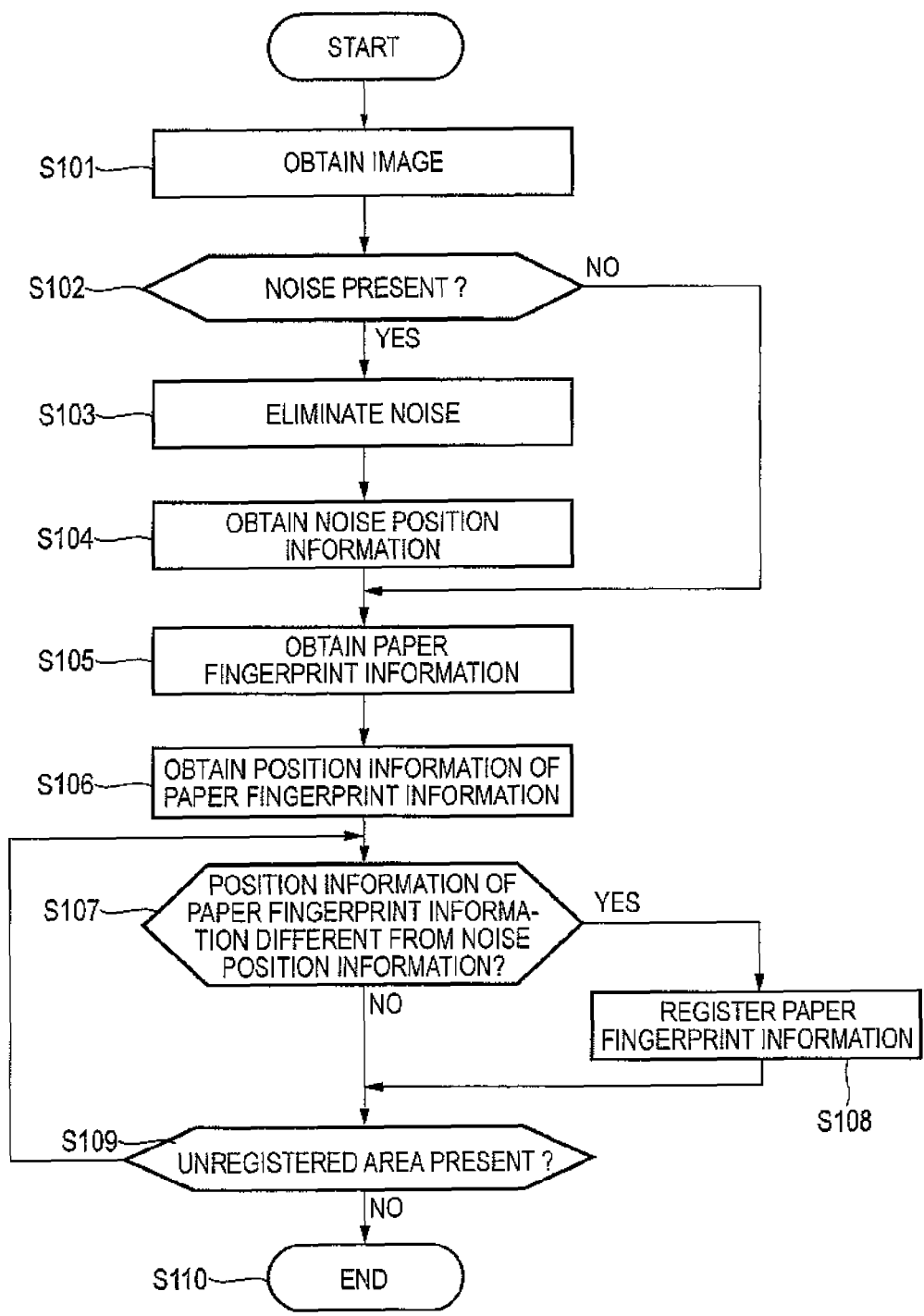
FIG. 5 is a view illustrating the flow of the registration processing of the image processing apparatus according to the first embodiment.

FIG. 5 is a view illustrating the flow of the registration processing of the image processing apparatus according to this embodiment. First, the image obtaining section 301 obtains an image read by the reading section 105 (at S101) as shown in FIG. 5.

The noise judgment section 302 judges whether noise is present in the image (at S102). In the case that the noise judgment section 302 judges that noise is present, the image generation section 304 generates a noise eliminated image in which noise is eliminated (at S103). The noise position information obtaining section 303 obtains the position information of the noise (at S104). On the other hand, in the case that the noise judgment section 302 judges that noise is not present, the processing advances to S105.

The paper fingerprint information obtaining section 305 obtains the paper fingerprint information from the noise eliminated image or from the image obtained at S101 (at S105). The paper fingerprint position information obtaining section 306 obtains the position information of the obtained paper fingerprint information (at S106).

The judgment section 307 judges whether the position information of the paper fingerprint information is different from the position information of the noise (at S107). In the case that the judgment section 307 judges that the position information of the paper fingerprint information is different from the position information of the noise, the paper fingerprint information is registered (at S108). Specifically speaking, the position information of the paper fingerprint information is registered together with the paper fingerprint information. On the other hand, in the case that the judgment section 307 judges that the position information of the paper fingerprint information is not different from the position information of the noise, the processing advances to S109.

The judgment section 307 judges whether any unregistered area is present in the obtained image (at S109). In the case that the judgment section 307 judges that an unregistered area is present, the processing returns to S107, and the judgment section 307 judges whether the position information of the next paper fingerprint information is different from the position information of the noise. On the other hand, in the case that the judgment section 307 judges that no unregistered area is present, the processing ends (at S110).

The flow of the registration processing described above is not limited to that described above but may be modified variously. The configuration described in the above-mentioned embodiment may be replaced with a configuration substantially identical thereto, or with a configuration having the same working effect as that thereof, or with a configuration capable of achieving the same purpose as that thereof.

For example, the paper fingerprint information obtaining section 305 may be configured so as to obtain the paper fingerprint information from areas in the noise eliminated image, not containing the noise, and the paper fingerprint information registration section 308 may be configured so as to register the paper fingerprint information. At the time of the registration, the position information of the paper fingerprint information may also be registered.

Figure 6:
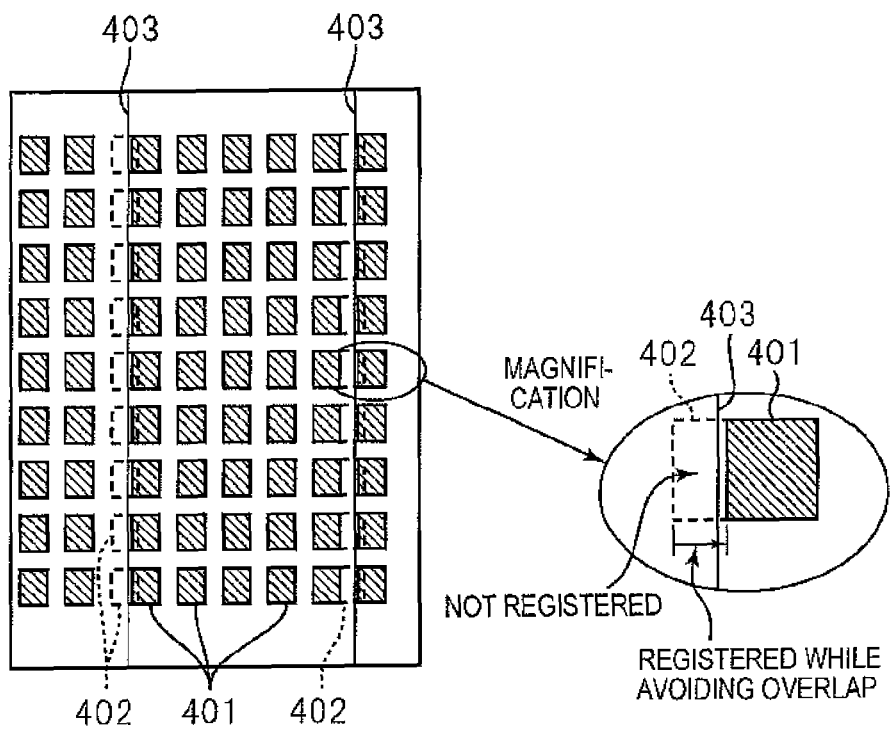
FIG. 6 is a view showing another example of a general outline of the processing executed by the paper fingerprint information registration section.

Furthermore, for example, in the case that the noise 403 overlaps with the areas 402 as shown in FIG. 6, the paper fingerprint information registration section 308 may be configured so that the registration is carried out while the areas 402 are moved so as not to overlap with the noise 403; in other words, the section may be configured so that the registration is carried out while the overlapping is avoided. In FIG. 6, the moved areas are represented by the areas 401 (registered areas). In this case, depending on the result of the judgment of the judgment section 307, the paper fingerprint information obtaining section 305 sets the areas 401 which are not overlapping with the noise 403 and from which the paper fingerprint information is obtained, and then obtains the paper fingerprint information from the areas 401. Then, the paper fingerprint information registration section 308 registers the paper fingerprint information together with its position information.

FIG. 6 is a view showing another example of a general outline of the processing executed by the paper fingerprint information registration section. The left side of FIG. 6 shows a case in which the noise 403 is included in the image of a read manuscript, and the right side of FIG. 6 shows the area 401 that is registered by the paper fingerprint information registration section 308 described later and the area 402 that is not registered. In addition, the right side of FIG. 6 is a partly magnified view of the left side of FIG. 6

Figure 7:
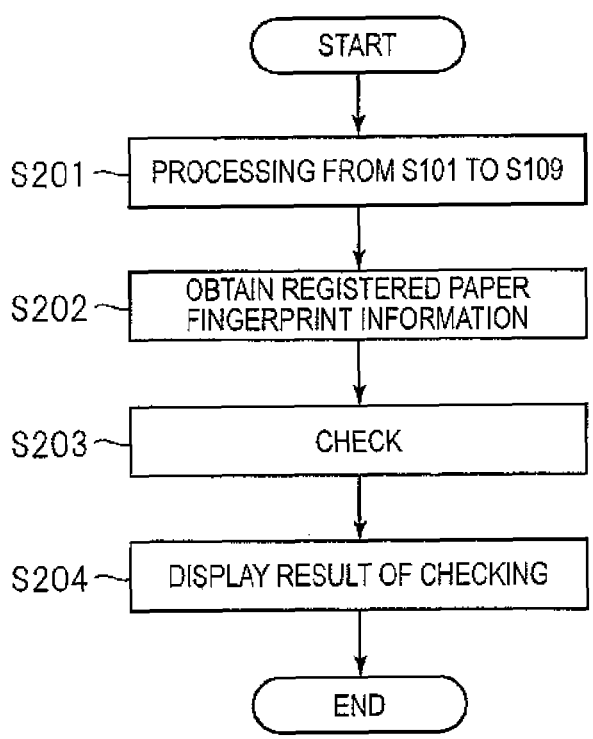
FIG. 7 is a view illustrating the flow of the checking processing of the image processing apparatus according to the first embodiment.

Next, the checking processing for verifying the originality of the medium 212 will be described below. FIG. 7 is a view illustrating the flow of the checking processing of the image processing apparatus according to this embodiment.

As shown in FIG. 7, first, processing similar to the processing from S101 to S109 shown in FIG. 5 is carried out for the medium 212 to be checked (at S201).

Next, the registered paper fingerprint information obtaining section 309 obtains the registered paper fingerprint information and its position information corresponding to the medium 212 to be checked (at S202). The paper fingerprint information and its position information are stored, for example, in the storage section 102 as described above.

The checking section 310 checks the registered paper fingerprint information against the paper fingerprint information to be checked on the basis of the corresponding position information (at S203). The result of the checking is displayed on the display section 104 (at S204).

The flow of the checking processing described above is not limited to that described above but may be modified variously. The configuration described in the above-mentioned embodiment may be replaced with a configuration substantially identical thereto, or with a configuration having the same working effect as that thereof, or with a configuration capable of achieving the same purpose as that thereof.

For example, although the configuration in which the paper fingerprint information is checked on the basis of one piece of position information corresponding thereto is described above, it may be possible to use a configuration in which respective pieces of the paper fingerprint information are checked on the basis of the corresponding plural pieces of the position information. In this case, for example, a configuration may also be used in which the result of the checking is displayed on the basis of the statistics of the result of the checking of the plural pieces of the paper fingerprint information to be checked. Specifically speaking, for example, in the case that, among a plurality of results of the checking of the plural pieces of paper fingerprint information, the results of the checking, the number of which is a preset value or larger, indicate that the medium 212 is original, the medium is judged to be original.

Furthermore, although the configuration in which the processing from S101 to S109 shown in FIG. 5 is carried out is used in the flow of the checking processing described above, the present invention is not limited to use this configuration. It may be possible to use a configuration in which paper fingerprint information is obtained from the medium to be checked in areas having the position information of the registered paper fingerprint information, and the paper fingerprint information is checked against the registered paper fingerprint information.

The present invention is not limited to the above-mentioned embodiment described above but may be modified variously. For example, the configuration described in the above-mentioned embodiment can be replaced with a configuration substantially identical thereto, or with a configuration having the same working effect as that thereof, or with a configuration capable of achieving the same purpose as that thereof.

Second Embodiment

Next, a second embodiment according to the present invention will be described below. The above-mentioned first embodiment in which the reading section 105 has two image sensors, i.e., the image sensors 207 and 208, is different from the second embodiment in which the reading section 105 has only one image sensor, i.e., the image sensor 208. Descriptions of the components similar to those of the first embodiment are omitted in the following descriptions.

Figure 8:
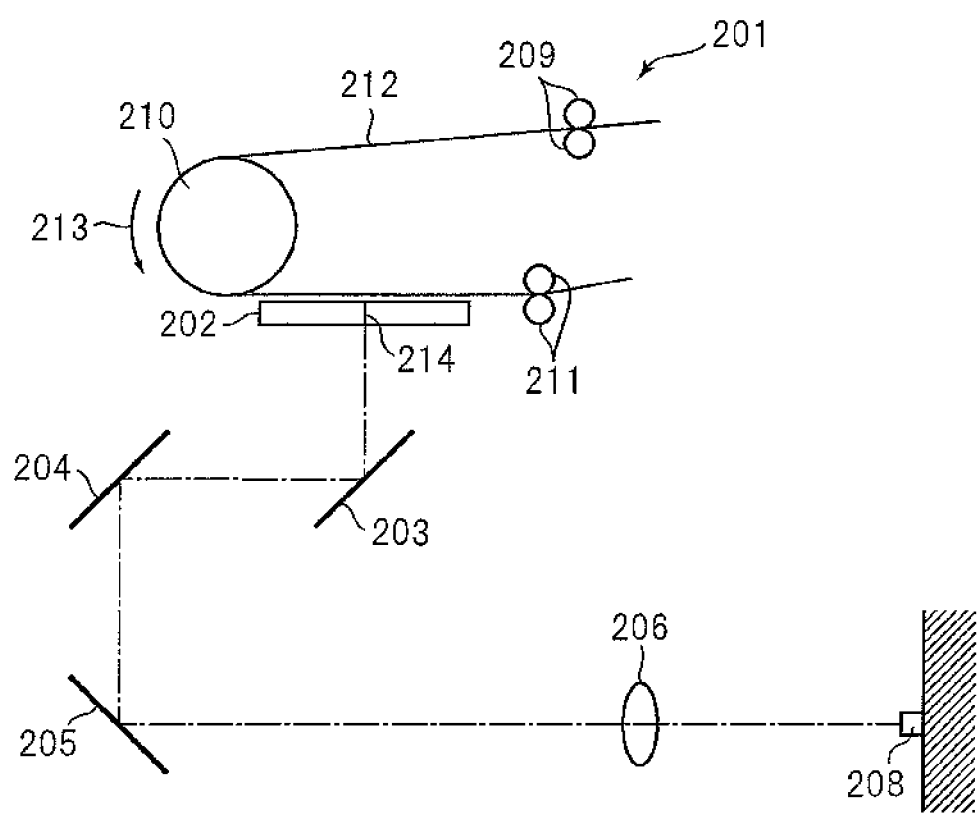
FIG. 8 is a view illustrating a configuration of the reading section of an image processing apparatus according to a second embodiment of the present invention.

FIG. 8 is a view illustrating a configuration of the reading section 105 according to this embodiment. The reading section 105 includes the conveying section 201, the contact glass 202, the first to third mirrors 203 to 205, the lens 206, and the image sensor 208 as shown in FIG. 8.

As in the first embodiment, the conveying section 201 has the lead-in rollers 209, the conveying roller 210 and the discharge rollers 211. The lead-in rollers 209 move the medium 212 one sheet at a time to the conveying roller 210 according to an instruction input to the operation section 103 by the user, for example. The conveying roller 210 moves the medium 212 onto the contact glass 202 while changing the conveying direction 213 of the medium 212.

At this time, the surface of the medium 212 is read by the image sensor 208. Specifically speaking, the reflected light from the medium 212 is imaged on the image sensor 208 via the first to third mirrors 203 to 205 and the lens 206, whereby the image sensor 208 obtains the image of the surface of the medium 212.

In other words, in this embodiment, one image sensor, i.e., the image sensor 208, reads the image of the medium 212 at one reading line. In other words, unlike the above-mentioned first embodiment in which two image sensors, i.e., the image sensors 207 and 208, and two reading lines are provided, one image sensor, i.e., the image sensor 208, reads the surface of the medium 212 that is conveyed on the reading line 214.

On the basis of the image from the image sensor 208, the noise judgment section 302 judges whether noise is present. In other words, the noise judgment section 302 judges whether the image read by the image sensor satisfies predetermined conditions. For example, the judgment section 307 judges that noise is present when such a streak as shown in FIG. 4 appears in the image read by the image sensor 208. Specifically speaking, the judgment section 307 specifies pixels having a pixel value (density value) not less than a predetermined reference value among the pixels of the image read by the image sensor and judges that noise is present in the case that the pixels are arranged continuously in the conveying direction. In this case, the arrangement of the pixels may be indistinguishable, in some cases, from a black line (an arrangement of black pixels in the image of the surface of the medium, identifiable as noise) included in the image, for example. However, since plural pieces of paper fingerprint information are registered as described above in the present invention, it may be possible to use a configuration in which the black line is judged as noise and the paper fingerprint information of the areas including the black line is not registered.

The present invention is not limited to the above-mentioned first and second embodiments described above but may be modified variously. For example, the configurations described in the above-mentioned embodiments can be replaced with a configuration substantially identical thereto, or with a configuration having the same working effect as that thereof, or with a configuration capable of achieving the same purpose as that thereof.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a noise position information obtaining unit that obtains noise position information regarding positions of noise in an image read by a reading unit that optically reads a surface of a medium,
   an image generating unit that generates a noise eliminated image that is obtained by eliminating a noise from the image,
   a pattern information obtaining unit that obtains pattern information indicating a pattern appearing on the surface of the medium from the noise eliminated image,
   a pattern information registering unit that registers the pattern information obtained from areas set on the basis of the noise position information in the noise eliminated image;
   a pattern position information obtaining unit that obtains pattern position information serving as a position information of the pattern information, wherein the pattern information registering unit registers the pattern information and the pattern position information; and
   a judging unit that judges whether the noise position information is different from the pattern position information after the noise is eliminated from the image,
   wherein in a case that the judging unit judges that the noise position information is different from the pattern position information, the pattern information registering unit registers the pattern information and the pattern position information.

2. The image processing apparatus according to claim 1, wherein
   the pattern information obtaining unit obtains the pattern information from the areas set on the basis of the noise position information in the noise eliminated image.

3. The image processing apparatus according to claim 1, wherein
   the reading unit has at least two imaging units that optically images the surface of the medium, at least at two positions different in the conveying direction of a conveying unit that conveys the medium, during the movement of the medium by the conveying unit, and
   the noise position information obtaining unit obtains the noise position information on the basis of the comparison between the images obtained by at least the two imaging units.

4. The image processing apparatus according to claim 1, wherein
   the reading unit has one imaging unit that optically images the surface of the medium during the movement of the medium by the conveying unit that conveys the medium, and
   the noise position information obtaining unit obtains the positions shown in the image.

5. A non-transitory computer readable medium storing a computer readable program executable by a computer for causing a computer to execute a process, the process comprising:
   obtaining noise position information regarding the positions of noise in an image by optically reading the surface of a medium,
   generating a noise eliminated image that is obtained by eliminating the noise from the image,
   obtaining pattern information from the noise eliminated image,
   registering the pattern information obtained from areas set on the basis of the noise position information in the noise eliminated image,
   obtaining pattern position information serving as a position information of the pattern information,
   registering the pattern information and the pattern position information,
   judging whether the noise position information is different from the pattern position information after the noise is eliminated from the image,
   registering the pattern information and the pattern position information in a case that the noise position information is different from the pattern position information.

* * * * *